United States Patent [19]
Juliano et al.

[11] Patent Number: 5,973,296
[45] Date of Patent: Oct. 26, 1999

[54] THICK FILM HEATER FOR INJECTION MOLD RUNNER NOZZLE

[75] Inventors: Roly Juliano, Hannibal; Christopher C. Lanham, O'Fallon; Louis P. Steinhauser, St. Louis, all of Mo.

[73] Assignee: Watlow Electric Manufacturing Company, St. Louis, Mo.

[21] Appl. No.: 09/175,302

[22] Filed: Oct. 20, 1998

[51] Int. Cl.[6] ..................................................... F27B 14/00
[52] U.S. Cl. ........................... 219/424; 219/543; 219/426
[58] Field of Search ..................................... 219/424, 420, 219/426, 422, 534, 543; 392/473; 222/146.5; 239/132, 135, 12; 29/611

[56] References Cited

U.S. PATENT DOCUMENTS

| | | | |
|---|---|---|---|
| 2,979,773 | 4/1961 | Bolstad | ........................................ 18/34 |
| 3,970,821 | 7/1976 | Crandell . | |
| 4,120,086 | 10/1978 | Crandell | .................................... 29/611 |
| 4,132,971 | 1/1979 | Caddock, Jr. . | |
| 4,203,197 | 5/1980 | Crandell | .................................... 29/611 |
| 4,304,544 | 12/1981 | Crandell | .................................. 425/549 |
| 4,485,387 | 11/1984 | Drumheller . | |
| 4,514,160 | 4/1985 | Davidsmeyer . | |
| 4,641,423 | 2/1987 | Crandell | .................................... 29/611 |
| 4,795,126 | 1/1989 | Crandell | .................................... 249/78 |
| 4,859,981 | 8/1989 | Peschl . | |
| 4,897,028 | 1/1990 | Barancik et al. . | |
| 5,007,818 | 4/1991 | Barancik et al. . | |
| 5,226,596 | 7/1993 | Okamura . | |
| 5,234,637 | 8/1993 | Reymann et al. . | |
| 5,569,474 | 10/1996 | Kitachi et al. . | |
| 5,705,793 | 1/1998 | Kitachi et al. . | |

OTHER PUBLICATIONS

ESL Brochure on "Tubular Heaters", reproduced from ESL –Europe News Issue 4, 1993 (1 page).
SEIKI Spear System America, Inc. Brochure, "SH–1 Hot Runner Probe" (2 pages).
Ohm Craft Brochure "Fine Film Surface Mount Resistor Network" (6 pages).
Ohm Craft Brochure "Fine Film Precision High Value Resistors" (9 pages).
Micropen Brochure "New Applications Bulletin –Solar Cells" (1 page).
Watlow Hme Page —Hot News "Watlow Thick Film Heaters" dated Oct.12, 1998 from http://www.watlow.com/hot-news/productreleases/thickfilm.html (2 pages).
Dekko Home Page—Dekko Heating Technologies—Technologies—"Dekko Printed Thick Film Heaters" dated Oct. 7, 1998 from http://www.dekkoheat.com/ptf.heaters.b.html (3 pages).
ESL Home Page—Electro–Science Laboratories, Inc. copyrighted f1997/8 dated Oct. 7, 1998"ESL Advanced Materials In Heaters On Stainless Steel" (1 page).
EBG Brochure "Thick Film Technology" (2 pages).
D–M–E Standard Brochure "Gate–Mate 4 Nozzles" (2 pages).

Primary Examiner—Tu Ba Hoang
Assistant Examiner—Vinod D. Patel
Attorney, Agent, or Firm—Herzog, Crebs & McGhee LLP

[57] ABSTRACT

Hot runner injection molding systems with externally heated injection runner nozzles for such systems. The heater is preferably a tubular heater with the resistive element applied to the exterior surface by fine film printing. The heater is adapted to externally heat a hot runner injection mold runner nozzle.

28 Claims, 6 Drawing Sheets

THICK FILM HEATER FOR INJECTION MOLD RUNNER NOZZLE

BACKGROUND OF THE INVENTION

1. Field of the Invention

This invention relates to hot runner injection molding systems and more specifically to externally heated injection runner nozzles for such systems.

2. Related Art

There is a need for a better way of heating injection nozzles in plastic molding machines.

Hot runner injection molding systems have several melted material flow passageways that are uniformly heated over the entire flow path leading from a molten reservoir to a mold cavity or cold runner. The melted material that flows through the passageway must remain liquid until reaching the mold cavity or cold runner. To control flow rate and pressure, the heated passageway leads to or from injection mold runner nozzles which may be externally heated. This nozzle is sometimes referred to as a hot runner gate injection nozzle or a hot runner probe injection nozzle but will hereafter be simply referred to as a "runner nozzle." These runner nozzles are typically located in the hot runner molding system's manifold base. The nozzles extend through ports leading to each of the molding cavities or to a secondary heated or unheated passageway within a mold block. It is essential to adequately and uniformly heat the runner nozzle because this is often the final point in the heated portion of the flow passageway just prior to being injected into the mold. At this point the material must be at or above its melting point in order for the molten material to flow freely through the runner nozzle, so the nozzle can reliably perform its function of controlling flow rate.

Significant transitions in temperature at the point of the runner nozzle are not desirable as the nozzle is a key part of any molding process because transitions in temperature may change the fluid consistency of the melted material such as thermoplastic which may result in a defective final product. Also, if it is desired to intermittently shut off flow and turn flow back on for a given nozzle, heating of the nozzle is necessary to maintain the residual material in a melted state, to prevent clogging.

Currently, runner nozzles are typically heated by a heat source external to the nozzle. Typically, the runner nozzle is heated by a resistive wire proportionally spirally wound heating element. The spirally wound element forms a cylinder that is co-axially disposed about the exterior surface of the runner nozzle. However this type of heater configuration operates inefficiently due to heat loss because of the open exposure of the heating element to the surrounding environment. It also increases the diameter of the nozzle and thus requires bigger openings in the manifold to receive the nozzle. Also, many of the standard nozzle heaters are not completely encapsulated by an insulated sheath, which make it more difficult to maintain a temperature at the runner nozzle location that is uniform with the remainder of the flow passageway. In addition the physical design of the resistive element (i.e. spiral) is limited as well. The gauge of the resistive wire heating element required to generate enough heat is such that the wire cannot be formed into complex circuit patterns. In many cases various complex circuit patterns other than a simple spiral pattern are desired in order to achieve more efficient heat distribution. Also, these types of heaters can be bulky and difficult to maintain and repair. Installation is difficult because of the large leads of the resistive element, and the mold designer must allocate space for the large leads and increased nozzle/heater combination. In addition, in many cases the externally heated runner nozzle apparatus has to be adapted to accommodate a thermocouple device which requires an additional space for the thermocouple and its wiring. A better way is needed to uniformly heat the runner nozzle, heat it efficiently and the design should be cost effective and easy to maintain and repair.

Conventional industrial equipment which provide heat externally to a flow passage, such as the subject runner nozzle, will generally provide heat by the means described above or by a single or multiple band heater design. However, there are some less common methods utilized to provide heat externally to a flow passageway. For example, one method is to apply a thick film resistive element layer to the external surface of a fluid flow passageway or to the external surface of a tubular heating sleeve by way of a decal application.

For the decal application process a resistive thick film pattern is printed on a sheet of silicone coated paper using standard pastes and screen print settings. The dried print is then covered with a clear acrylic coating, and the thick film decal is ready after drying. Soaking in water then releases the thick film paste with its acrylic top carrier film. This is then rolled onto the external surface of an object such as a tubular fluid flow passageway or a tubular heating sleeve. Firing in a conventional furnace burns off the acrylic layer and sinters the thick film pattern onto the surface.

The decal method is chosen by some artisans because they determined that printing a resistive trace circuit pattern on non-flat surfaces such as tubular surfaces proves very difficult or too expensive to be practical using standard screen printers because of the three-dimensional movements of the printer head which would be needed. A tubular heater sleeve bearing the decal application and co-axially disposed on the runner nozzle is a solution since it allows two-dimensional production of the circuit and subsequent bending of the decal in the third dimension. Also, the decal can be applied directly to the runner nozzle's external cylindrical surface. In either case a porcelain dielectric layer is usually applied to the metallic external surface of the tubular shaped object before the decal is applied.

However, the decal method has lots of problems. The decal method is not widely used because it is prone to error. Application of the thick film to the decal substrate is one step where errors may occur. Once the thick film is correctly two-dimensionally applied to the decal substrate, it has to be reapplied in the third dimension to a cylindrical external surface that has been properly prepped. The reapplication process may result in tears or voids in the thick film because at this stage the material is not a coherent solid mass. Air bubbles may form between the thick film and the final tubular surface. Firing in a furnace is required to cure and to burn off an acrylic layer. Again, a void may result from this process particularly if the acrylic burns off in a non-uniform manner.

In many cases it is desired to have multiple resistive element layers and multiple dielectric layers. If the decal application method described above is utilized to accomplish this task the problems asserted above will only be compounded. Proper alignment of each decal with immediately preceding decal is a significant problem. Either multiple decal application steps will have to be carefully and precisely performed or multiple layers will have to be initially applied to the decal prior to the transfer application step. However, in either case the problems asserted above such as voids and cracks will be multiplied both by the extra steps and extra layers. It should be noted that multiple firings will be necessary in order to cure each decal application layer thereby increasing the risk for a defective end product. This risk factor is important because multiple layers are often desired to achieve a certain temperature profile, or achieve greater thermal isolation, or to maintain temperature uniformity.

The decal method, as well as a screen printing method, have another serious drawback. They are limited as to the trace pattern that can be utilized for a heater design. In many cases, it is desired to print a continuous circumferential spiral trace pattern around a tubular body for efficient and uniform heat distribution. This is not physically achievable with a screen printing or decal printing method, which must have gaps for structural support in the mask and which will have edges that, for a tubular heater, would need to be so precisely aligned as to be impractical and would still have an interface or gap at the edges. Thus, neither a decal nor a screen can physically produce a continuous circumferential spiral trace pattern on a tubular body.

In addition to the decal method, another method is utilized specifically for hot runner nozzle external heaters. This method involves flat ceramic substrates and a printed circuit pattern thereon by means of screen printing. A printed circuit pattern is applied to a flat ceramic substrate sheet. When the printed circuit pattern is applied to the flat ceramic sheet, the sheet is in a paste or unfired state. Therefore the sheet is flexible and can then be wrapped around a tubular object. The sheet with the circuit pattern applied is usually wrapped around a ceramic core and fired for curing thereby completing the heating element. In known applications this completed heater can then be co-axially inserted onto a runner nozzle. This wrapping method could be used to wrap the ceramic substrate with the printed circuit applied around a metallic tube with a ceramic exterior surface thereby forming a tubular heating element. However, it cannot produce a continuous circumferential spiral trace pattern. It should be noted that problems similar to that of the decal method as discussed above may occur. Voids and tearing may occur during the wrapping and firing steps.

A way is needed to reliably manufacture a tubular heater with an optional continuous circumferential spiral trace pattern that can be co-axially disposed around or made an integral part of the exterior surface of an injection mold runner nozzle in order to externally heat the nozzle thereby replacing the conventional proportionally spirally wound resistive wire heating element. The method must be produceable, easy to accommodate and install, maintainable, and reliable.

SUMMARY OF THE INVENTION

It is in view of the above problems that the present invention was developed.

The invention thus has as an object to provide a resistive heating element that is tubular in form that can be co-axially disposed around an injection mold runner nozzle or that is an integral part of the nozzle which is reliable, easy to maintain, and has a small profile and an optional continuous circumferential spiral trace pattern.

It is also an object to provide more efficient external heating to the nozzle.

It is also an object to provide better temperature control capability.

It is also an object to provide more flexibility for the heater element design.

It is also an object to provide the ability to integrate sensors in the heating element design.

The invention satisfies the above objects by providing a method and apparatus for external heating of an injection mold runner nozzle. The apparatus is a tubular heater that consists of a metallic tubular substrate that has a dielectric film layer and a resistive thick film layer applied directly to the exterior cylindrical surface of the tubular substrate by the method of precision fine film printing. This method is similar to the method used to produce some thin film resistors. Thin film resistors are made by applying the resistor film to a flat ceramic substrate thereby forming a flat pack resistor like those utilized for surface mount applications. There have also been successful attempts to apply the resistive film directly to a tubular ceramic core of a resistor by this same method, however it is not commonly performed. Also the standard screen printing and decal printing methods are not physically capable of producing a continuous circumferential spiral trace pattern. However, as noted above, this process has not been used to make resistive element heaters with single or multiple resistive layers because the prior art teaches that this it is not practical to print resistive element circuit patterns for heaters directly on a non-flat surface when using printing methods such as screen printing. This prior art teaching is reflected by the use of decal and wrapping methods in lieu of printing. The tubular heater is then co-axially disposed around the runner nozzle. This thick film fine film printing method can also be directly applied by the same process to the cylindrical exterior surface of a runner nozzle's main body. In addition, the portion of the nozzle body where the thick film is directly applied can be a separate removable component of the nozzle. The thick film application applied directly to the nozzle body increases the nozzle's diameter by a minimal amount thus making the overall diameter of the externally heated runner nozzle apparatus less than those with spiral resistive wire elements. That saves on hole sizes and allows more of a gap between the nozzle and the manifold for a given hole size. This forces a greater portion of the heat toward the nozzle. The thick film heater can also be applied to the interior cylindrical surface of a cavity within the mold manifold where the runner nozzle is placed, even though this introduces a gap which would reduce thermal efficiency. The thick film can be applied in various patterns to adapt to the heating requirements thus the pattern is not limited to spiral patterns. It should also be noted that multiple alternating dielectric and resistive element heater layers can be printed on the substrate stacked one on the other. Also, temperature sensors can be printed on a given layer. This alleviates the need to adapt the structure of the externally heated runner nozzle apparatus to accommodate a temperature sensor like a thermocouple.

One commercially available fine film printing apparatus from Ohmcraft which can be used to make the patterns of the invention on a tubular nozzle is defined within U.S. Pat. 4,485,387 issued Nov. 27, 1984 to Drumheller as a result of a U.S. Navy development contract. That fine film printing system is an inking system where circuit patterns are written by ink feed through an orifice of a fine tip writing pen. The printed line's cross-section is controlled by synchronous positive displacement pumping of ink through an orifice within motion of the substrate with the pen. In response to the viscous forces, a dynamic positive pen force is maintained on the extruding ink, thereby maintaining the desired thickness-to-width ratio of the lines. This positive dynamic force also allows for printing on non-flat surfaces. In addition to the positive dynamic force, the ink flow valve and ink pump can be dynamically controlled to synchronize with the relative movement of the substrate. The displacement of the pen with respect to the substrate is sensed by an electro-optic sensor.

It was discovered, as part of the invention that greater temperature control and thermal efficiency is achieved.

However, even if this were not the case the heater is easier to produce more reliable, and maintainable.

BRIEF DESCRIPTION OF THE DRAWING

The advantages of this invention will be better understood by referring to the accompanying drawing, in which.

DESCRIPTION OF THE INVENTION

Figures 1, 2:
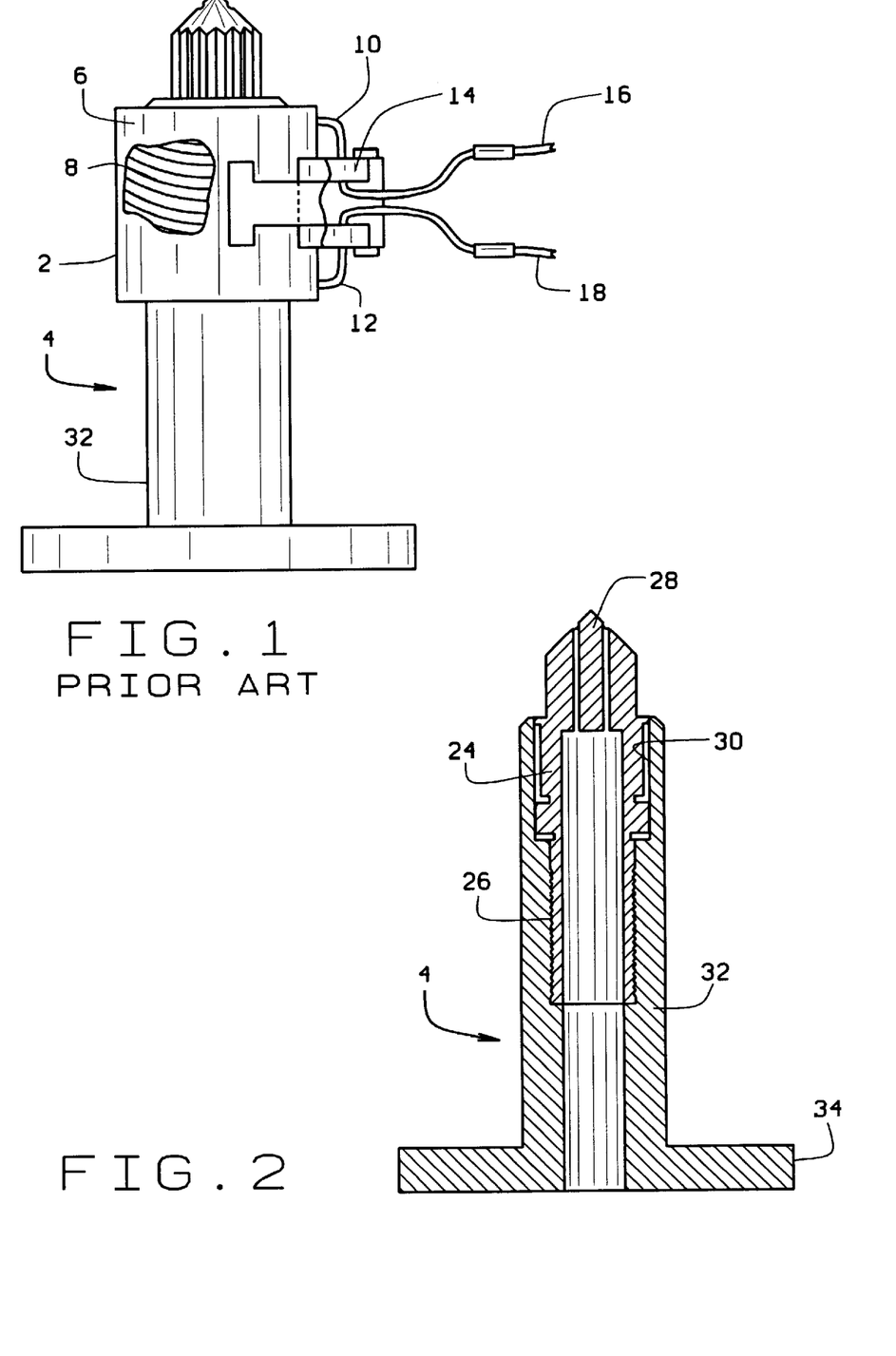
FIG. 1 shows a prior art heater installed on a runner nozzle with a portion of the heater sheathing cut away to reveal a proportionally spirally wound resistive wire.
FIG. 2 shows a cross section of a typical prior art runner nozzle.

Referring first to FIG. 1, the prior art heater 2 is shown co-axially disposed around a runner nozzle body 32 for clarification purposes. A portion of the heater sheath 6 is cut away revealing the proportionally spirally wound resistive wire element 8. The opposing lead ends 10 and 12 of the resistive wire element 8 extend from the cylinder formed by the spirally wound resistive wire. Lead ends 10 and 12 are threaded through and crimped by a guide bracket 14. Leads 10 and 12 extend laterally from the guide bracket and are then electrically connected to two power lines 16 and 18. It should be noted that the sheath 6 does not totally encapsulate the wire element 8. The sheath 6 only partially covers the exterior surface opposite nozzle 4 of the spirally wound element 8. Therefore, heat generated by the element is virtually free to dissipate to the surrounding environment as oppose to more efficiently concentrating heat about the runner nozzle. It can also be seen that this method is rather awkward and cumbersome with the lead extension 10 and 12 and the guide bracket 14. Also, the wire diameter and the bracket extension increases the overall diameter of the assembly. In addition it should be noted that many externally heated runner nozzle designs are required to accommodate a thermocouple device or other heat sensing device, but this is not shown in the figure.

Referring to FIG. 2, the cross section of a typical runner nozzle 4 is shown. The runner nozzle head 24 is shown. The nozzle head 24 has a threaded end 26 and an injection tip end 28. The nozzle head 24 is shown co-axially threaded into an open end 30 of the runner nozzle tubular body 32 of the runner nozzle 4. The tubular body 32 has a flanged end 34.

Figure 2A:
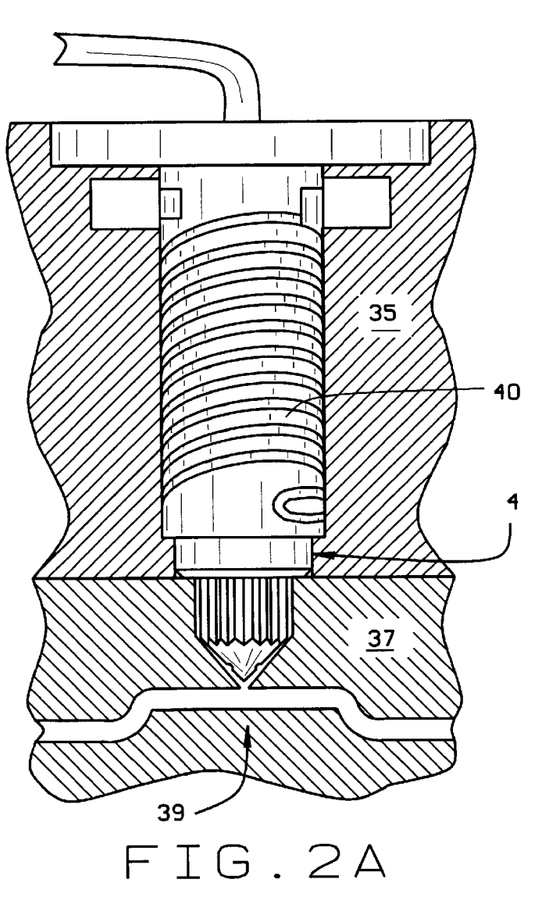
FIG. 2a shows the prior art heated runner nozzle and FIG. 2b the thick film heated runner nozzle installed in an injection mold system.
Figure 2B:
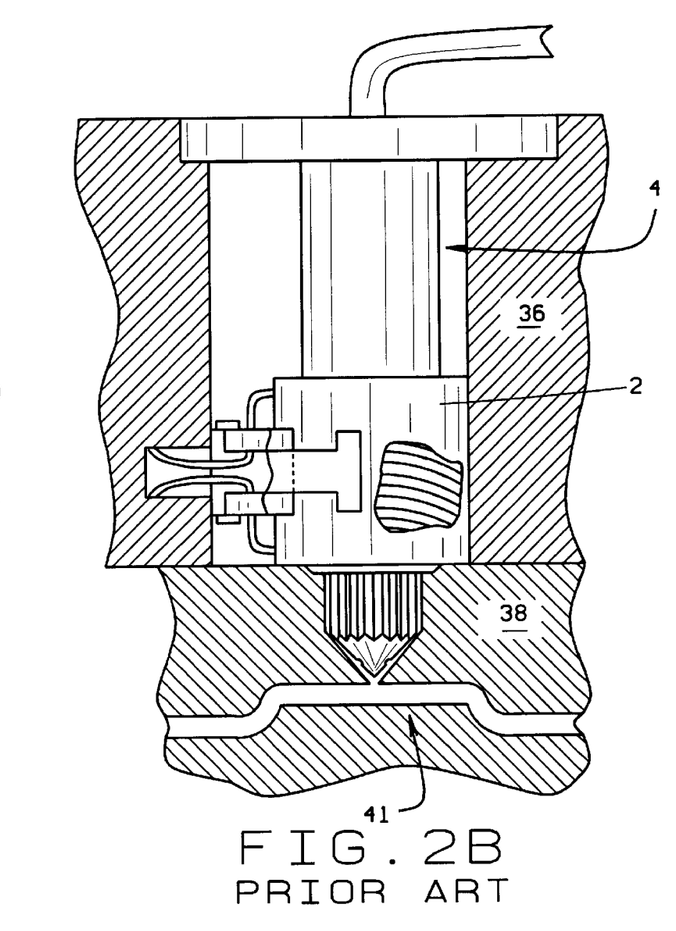

Referring to FIGS. 2a and 2b, two runner nozzles 4 are shown installed in a hot runner mold injection system. One has a thick film tubular heater 40 in FIG. 2a and the other a prior art heater 2 in FIG. 2b. They are shown side-by-side for comparison. The manifolds 35 and 36, the mold blocks 37 and 38, and the mold gates 39 and 41 in FIGS. 2a and 2b respectively are shown.

Figure 3:
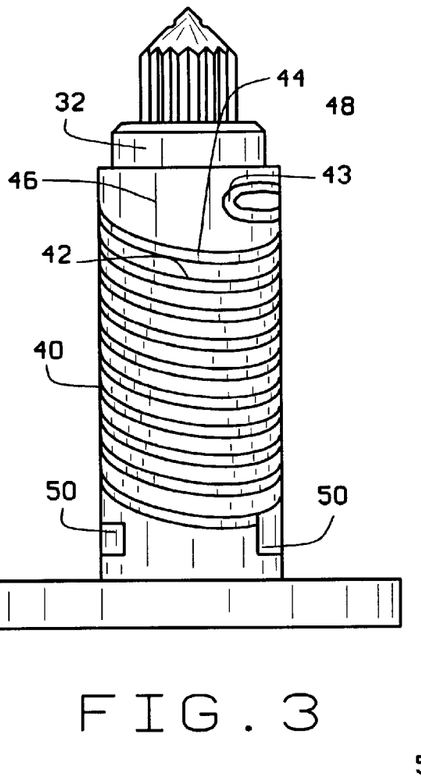
FIG. 3 shows a thick film resistive element tubular heater sleeve co-axially disposed on a typical runner nozzle.

Referring to FIG. 3, a thick film resistive element tubular heater 40 co-axially disposed on a typical runner nozzle body 32. A non-flat thick film resistive element layer 42 is shown printed on top of a non-flat dielectric layer 44 which has been printed on the non-flat, in this case cylindrical, exterior surface 46 of the tubular metallic heater core 48 directly beneath the resistive element layer 42, refer to FIG. 4a for detail. The exterior surface 46 serves as the substrate surface, although the dialectric could be applied directly to the nozzle and the nozzle would then serve as the substrate surface. The resistive element layer 42 is printed directly on the dielectric layer 44 surface in a spiral pattern. The spiral pattern is formed by two parallel continuous circumferential spiral line traces which meet at a 180 degree bend 43 on the opposite end from the starting point. This allows the power terminal pads 50 to be printed on the same end of the heater for easy access of terminal connections.

The thick film ink utilized for the resistive element, dielectric, and termination pad is of the type that can be applied on stainless steel. For example, items from the product line of ESL, a thick film producer, can be utilized. ESL 29115 thick film for resistive traces, ESL 4914 for dielelectric, and ESL 9695 for termination pad, can all be utilized.

Figure 4:
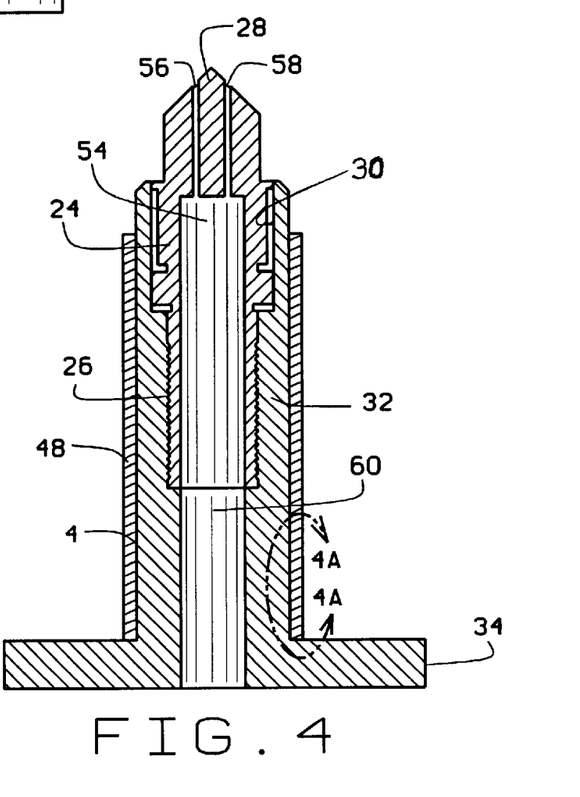
FIG. 4 shows a cross section of a tubular thick film resistive element heater sleeve co-axially disposed on a typical runner nozzle.
Figure 4A:
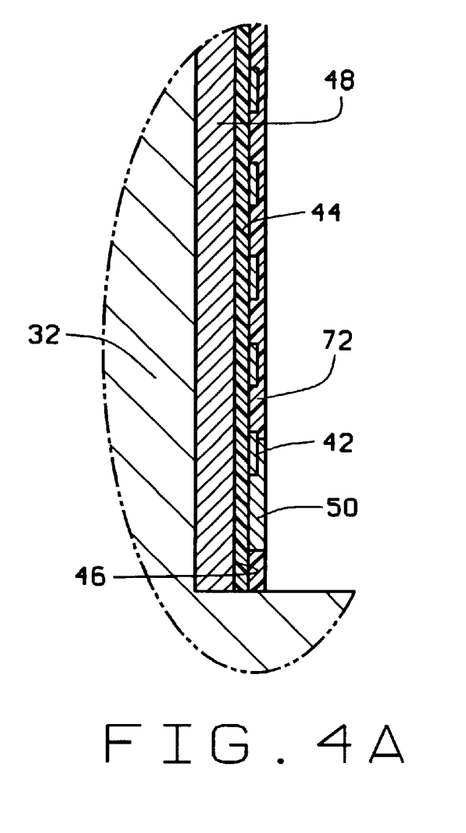
FIG. 4a Detail of applied layers on exterior surface of tubular heater sleeve.
Figure 4B:
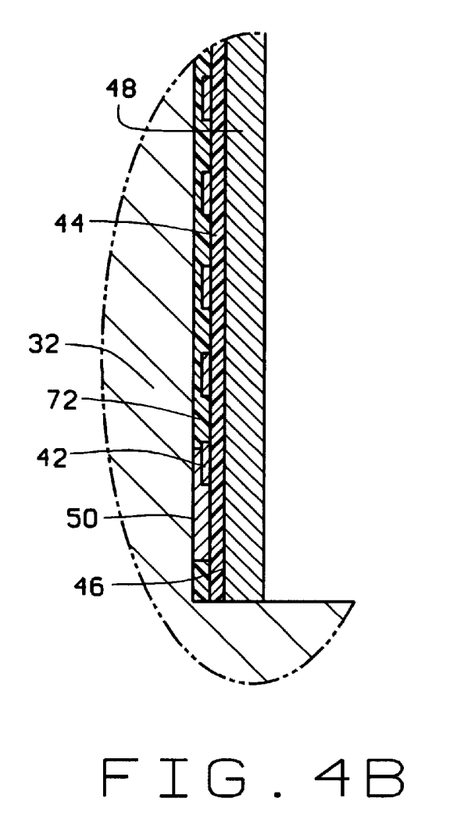
FIG. 4b Detail of applied layers on interior surface of tubular heater sleeve.

Referring to FIG. 4, the cross section of a tubular thick film resistive element heater co-axially disposed on a typical runner nozzle body is shown. The cross sectional area of the nozzle head 24 reveals a hollow interior 54 and two injection exit orifices 56 and 58 in the injection tip end 28. On the opposing end of the nozzle head 24 is a threaded end 26 which is screwed into the open end 30 of the tubular body 32. The cross section of the tubular body 32 reveals its hollow cylindrical interior 60. The tubular body 32 has a flanged end 34. The tubular heater core 48 is co-axially disposed around the tubular body 32. Referring to FIG. 4a, there are several layers of material that have been printed on the exterior surface 46 of the tubular metallic heater core 48. A dielectric layer 44 has been applied first which is an accumulation of several thin layers generated by several passes of the precision fine film printing head printing head. The fine film precision printing pen that is utilized to apply the resistive film is typical of the type used to manufacture thin film resistors, however of the type to be used to apply thick film for stainless steel as noted above. The resistive element thick film layer 42 is then applied on top of the dielectric layer 44 in the pattern desired (i.e., two parallel continuous circumferential spiral traces terminating at a 180° bend). Then the lead termination pads 50 are printed. Then an acrylic over glaze layer 72 is applied. Referring to FIG. 4b, the same printing process is optionally applied to the interior cylindrical surface of the tube.

Figures 5, 5A:
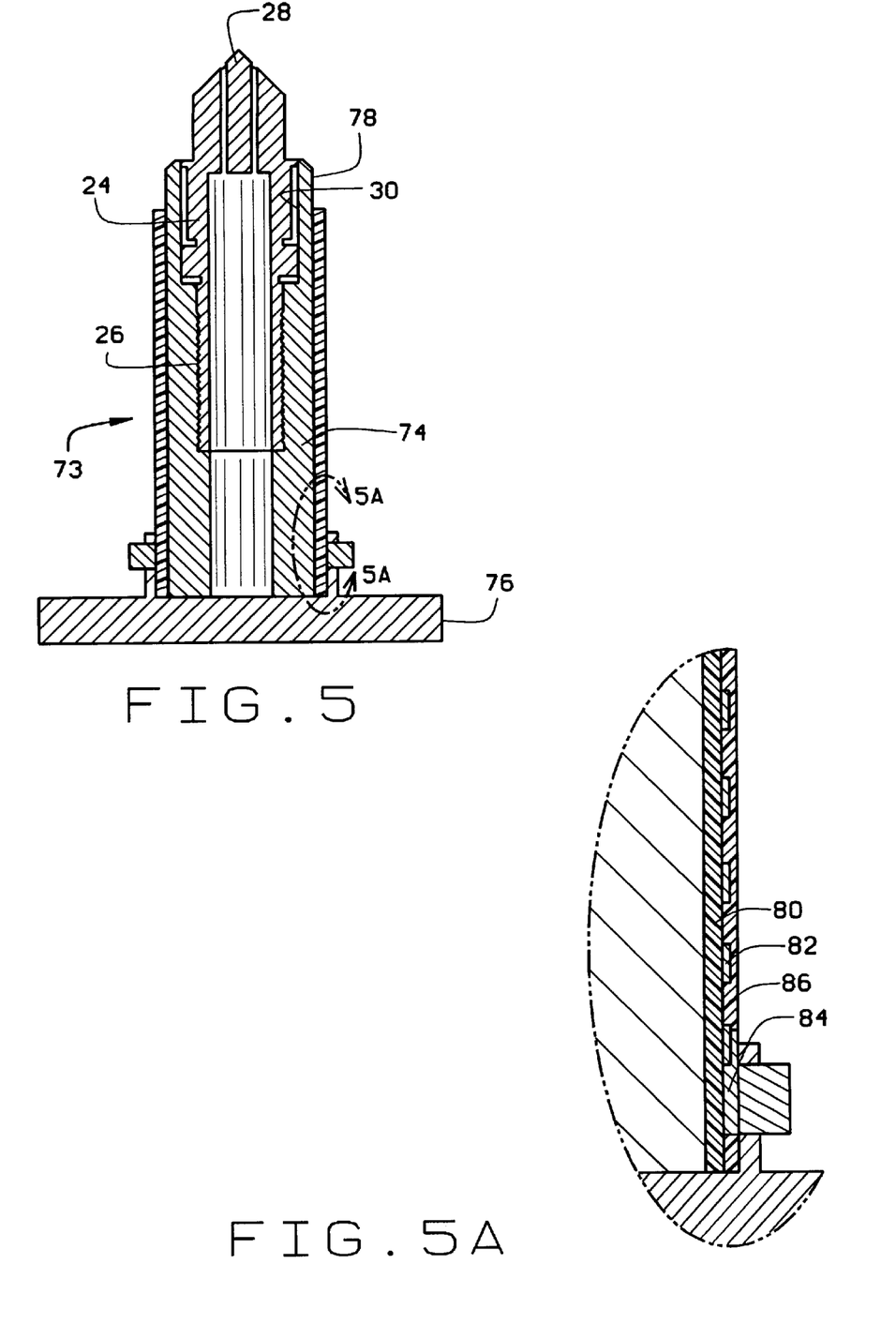
FIG. 5 shows a thick film resistive element heater shown as an integral part of the runner nozzle as the thick film is applied directly to exterior surface of runner nozzle.
FIG. 5a Detail of applied layers.

Referring to FIG. 5, a cross sectional view is shown of a thick film resistive element heater as an integral part of the runner nozzle body. The runner nozzle 73 is a three part apparatus (nozzle head 24, tubular body with integral heater 74, and flanged end 76) as opposed to a typical two part apparatus (nozzle head 24 and tubular body 32) as seen in FIG. 4. The cross sectional view reveals that the heater element is printed directly on the exterior cylindrical surface 78 of the tubular body 74. Referring to FIG. 5a a dielectric layer 80 has been applied first which is an accumulation of several thin layers generated by several passes of the precision fine film printing pen. The fine film precision printing pen that is utilized to apply the resistive thick film is typical of the type used to manufacture thin film resistors. The resistive thick film layer 82 is then applied on top of the dielectric layer 80 in the pattern desired. Then the lead termination pads 84 are printed. Then an acrylic over glaze layer 86 is applied.

Figures 6, 6A:
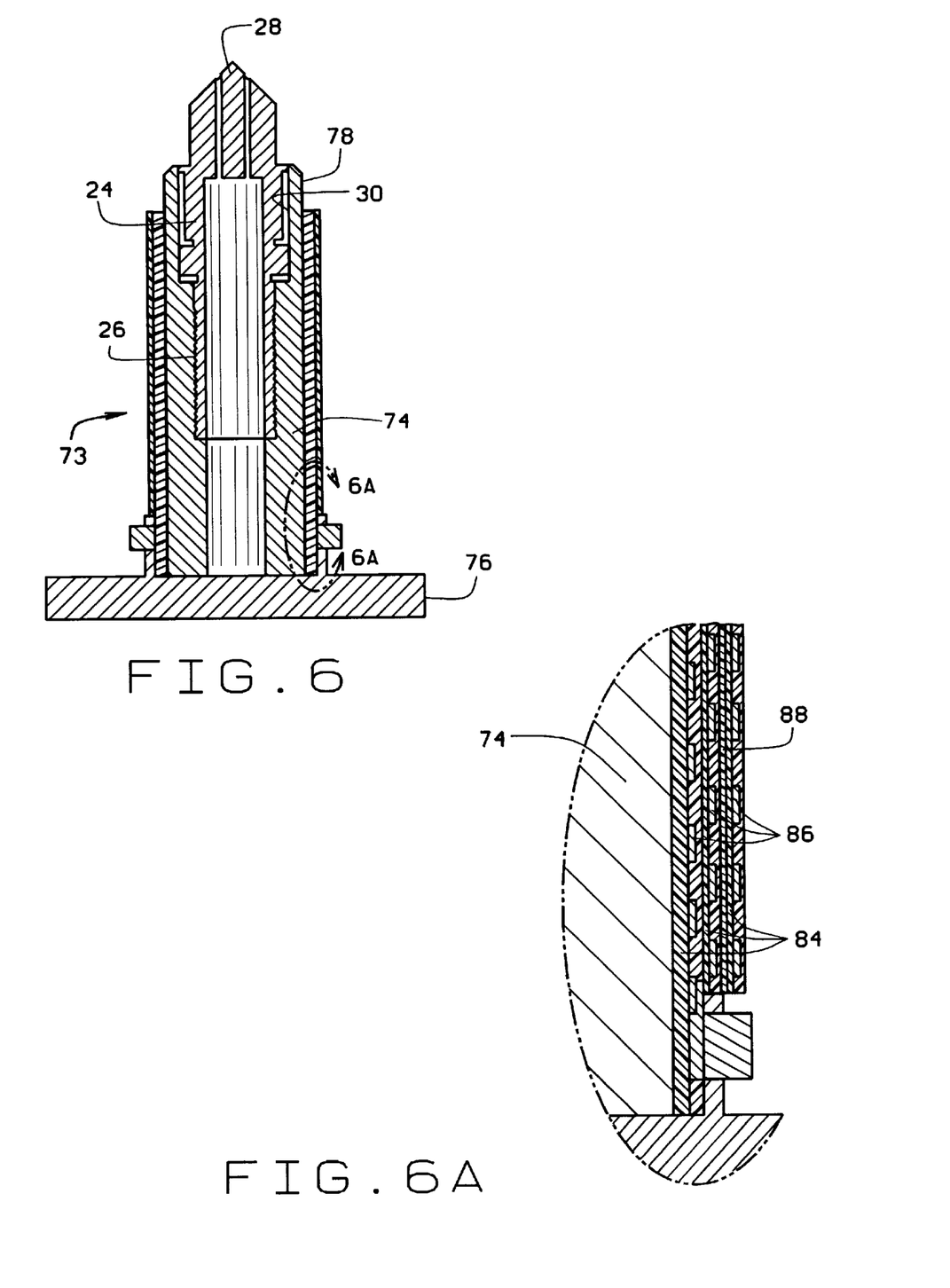
FIG. 6 shows a thick film resistive element heater with an optional layer dedicated to a temperature sensor.
FIG. 6a Detail of applied layers.

Referring to FIG. 6 a cross sectional view is shown of a thick film resistive element heater as an integral part of the runner nozzle body. Referring to FIG. 6a, this embodiment has alternating stacked layers of dielectric 84, thick film resistive element 86, and temperature sensor 88 material. The resistive element layers can be connected together by two terminal pads connecting all layers together in parallel or multiple terminal pad pairs can be allocated per layer, thereby powering them individually. The temperature sensor 88 can be a thermocouple device.

The embodiments shown in FIG. 4 and FIG. 5 perform essentially the same way except that the FIG. 5 embodiment has a smaller outer diameter and there is less thermal mass to control. With either embodiment the melted material flows through the opening on the flange end of the runner nozzle and continues to flow through the cylindrical interior channel of the tubular body and then on to the hollow interior cavity of the nozzle head. The fluid then exits the orifices of the injection tip end of the nozzle head for entry in to the mold cavity. The runner nozzle is heated by the thick film resistive element heater in order to maintain the material at a temperature that is uniform with the remainder of the flow passageway.

In view of the foregoing, it will be seen that the stated objects of the invention are achieved. The above description explains the principles of the invention and its practical application to thereby enable others skilled in the art to best utilize the invention in various embodiments and with various modifications as are suited to the particular use contemplated. As various modifications could be made in the constructions and methods herein described and illustrated without departing from the scope of the invention, it is intended that all matter contained in the foregoing description shall be interpreted as illustrative rather than limiting. Thus, the breadth and scope of the present invention should not be limited by any of the above-described exemplary embodiments, but should be defined only in accordance with the following claims appended hereto and their equivalents.

All patents, if any, referenced herein are incorporated in their entirety for purposes of background information and additional enablement.

What is claimed is:

1. In an injection mold runner nozzle having a substrate surface, a heater comprising:
   a) a fine film printed dielectric layer applied on said substrate surface;
   b) a fine film printed resistive element layer applied on said dielectric layer;
   c) a fine film printed terminal contact applied in electrical contact with said resistive element for electrical connection to a power source; and
   d) an over glaze layer printed on said resistive element layer.

2. The heater of claim 1, where said substrate surface is a non-flat surface.

3. The heater of claim 2, where said non-flat surface is cylindrical.

4. The heater of claim 3, where said cylindrical surface is the exterior surface of a heating tube co-axially disposed about a runner nozzle body.

5. The heater of claim 3 where said cylindrical surface is the interior surface of a heating tube co-axially disposed about a runner nozzle body.

6. The heater of claim 3, where said cylindrical surface is the exterior surface of a runner nozzle body.

7. The heater of claim 6, where said resistive element is a printed circuit pattern having parallel circumferential proportionally spirally wound continuous resistive traces.

8. The heater of claim 7 wherein said spirally would traces are electrically connected at their ends by a resistive trace having a 180 degree bend.

9. The heater of claim 6, further comprising a temperature sensing layer printed between the dielectric and resistive element layers.

10. The method of heating comprising the steps of:
    (a) precision fine film printing a dielectric layer on an exterior substrate heating surface of a runner nozzle;
    (b) precision fine film printing a resistive element layer on said dielectric layer;
    (c) precision fine film printing terminal contacts in electrical communication with said resistive element;
    (d) precision fine film printing of a protective over glaze on said resistive element layer; and
    (e) electrically powering said terminal contact.

11. The method of claim 10 where said precision fine film printing is on a non-flat surface.

12. The method of claim 11 where said non-flat surface is cylindrical and further comprising the step of rotating a printing head relative to the non-flat surface about an axis of the nozzle during step (b) thereof.

13. The method of claim 12 where said cylindrical surface is the exterior surface of a tubular heater adapted to be co-axially disposed about a runner nozzle body.

14. The method of claim 12 where said cylindrical surface is the interior surface of a tubular heater adapted to be co-axially disposed about a runner nozzle body.

15. The method of claim 12 where said cylindrical surface is the exterior surface of a runner nozzle body.

16. The method of claim 15, where said printing is in a parallel dual trace proportional circumferential continuous spiral pattern where the dual traces terminate at a 180 degree bend.

17. The method of claim 15, further comprising the steps of:

precision fine film printing of a plurality of subsequent dielectric layers; and precision fine film printing of a plurality of subsequent resistive element layers in an alternating sequence.

18. The method of claim 17 further comprising the step of precision fine film printing a temperature sensing layer between the dielectric and resistive element layers.

19. A heater comprising:

an exterior substrate surface of an injection mold runner nozzle;

a dielectric layer applied on said substrate surface by precision fine film printing;

a resistive element layer applied on said dielectric layer by precision fine film printing;

a terminal trace for electrical contact to a power source in electrical contact with said resistive element applied by precision fine film printing; and an over glaze layer applied on said resistive element layer by printing.

20. The heater of claim 13 where said resistive and dielectric layers are applied by printing non flat layers on a non-flat substrate surface.

21. The heater of claim 20 where said non-flat layers are applied by printing a cylindrical layer on a cylindrical substrate surface.

22. The heater of claim 21 where said cylindrical substrate surface is the exterior surface of a tube co-axially disposed about a runner nozzle body.

23. The heater of claim 22 where said cylindrical substrate surface is the exterior surface of a runner nozzle body.

24. The heater of claim 23 where said resistive element is applied by printing in parallel proportional circumferential continuous spiral dual trace patterns that meet at a 180 degree terminating bend.

25. The heater of claim 23 further comprising:

a plurality of restive element layers applied by fine film printing; and a plurality of dielectric layers applied by fine film printing alternatively applied.

26. The heater of claim 23 having a temperature sensor layer applied by fine film printing between dielectric and resistive element layers.

27. An injection mold runner nozzle body having an exterior substrate surface comprising:

a) a fine film dielectric layer printed on said substrate surface;

b) a fine film resistive element layer printed on said dielectric layer for heating;

c) a fine film terminal contact printed in electrical contact with said resistive element for electrical connection to a power source; and d) an over glaze layer printed on said resistive element layer.

28. An injection mold runner nozzle having a co-axially disposed cylindrical sleeve with an exterior substrate surface comprising:

a) a fine film dielectric layer printed on said substrate surface;

b) a fine film resistive element layer printed on the dielectric layer for heating;

c) a fine film terminal contact printed in electrical contact with said resistive element for electrical connection to a power source; and d) an over glaze layer printed on the resistive element layer.

* * * * *